United States Patent Office 3,547,910
Patented Dec. 15, 1970

3,547,910
2β,3β - ALKYLINDENEDIOXY - 6 - OXYGENATION BIS NOR CHOLANIC ACID COMPOUNDS AND THE METHYL ESTERS THEREOF
Andor Fürst and André Furlenmeier, Basel, Albert Langemann, Binningen, and Guy Waldvogel, Riehen, Switzerland, and Peter Hocks, Ulrich Kerb, and Rudolf Wiechert, Berlin, Germany, assignors to Hoffmann-La Roche Inc., Nutley, N.J., a corporation of New Jersey
No Drawing. Original application Aug. 9, 1966, Ser. No. 571,187. Divided and this application Feb. 29, 1968, Ser. No. 709,187
Claims priority, application Germany, Oct. 15, 1965, Sch 37,892; Jan. 27, 1966, Sch 38,384; Switzerland, Mar. 24, 1966, 4,336/66
Int. Cl. C07c 173/00
U.S. Cl. 260—239.55                10 Claims

ABSTRACT OF THE DISCLOSURE

This invention is directed to 22-functionalized 2,3-disubstituted 6-keto steroids which are useful as metamorphosis hormones and are additionally useful as intermediates for the production of other insect hormones. Accordingly, the compounds may be employed in the control of insect population.

RELATED APPLICATIONS

This application is a division of applicants' copending application Ser. No. 571,187, filed Aug. 9, 1966 now abandoned. Other related applications of Ser. No. 571,187, filed by the applicants' include Process for the Preparation of 5β-H-6-Keto-Steroids, Ser. No. 709,238, filed of even date herewith; 5β-H-6-Keto-Pregnane-Derivatives, Ser. No. 709,186, filed of even date herewith and 20-Hydrocarbyl-6-Keto-Steroids, Ser. No. 709,239, filed of even date herewith.

DETAILED DESCRIPTION OF THE INVENTION

This invention is concerned with steroids having activities as insect metamorphosis hormones and to methods for their production. This invention is also concerned with certain novel steroids which are useful per se as metamorphosis hormones and are additionally useful as intermediates for the production of other insect metamorphosis hormones.

The steroids which are produced in accordance with the processes of this invention are those represented by the formula:

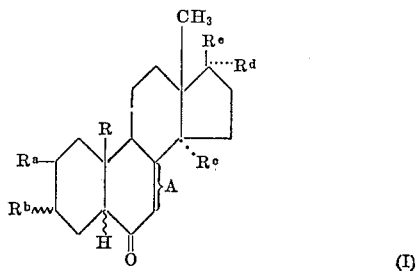

(I)

wherein R is hydrogen or methyl; $R^a$ is hydrogen, hydroxy, lower acyloxy, or lower alkoxy; $R^b$ is hydroxy, lower acyloxy, or lower alkoxy; $R^a$ and $R^b$, when taken together and when $R^b$ is in the β-orientation, are lower alkylenedioxy; A represents a single or a double bond; $R^c$ is hydrogen or hydroxy; $R^d$ is hydrogen or lower alkyl; $R^e$, when $R^d$ is lower alkyl, is hydroxy or lower acyloxy, and when $R^d$ is hydrogen, is hydroxy, lower acyloxy, or a radical of the formula $-C(CH_3)R^fR^g$; $R^f$, when taken alone, is hydrogen or hydroxy; $R^g$, when taken alone, is $-CO_2Z$, $-CHO$, $-CH-(O-lower\ alkyl)_2$,

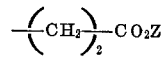

aliphatic hydrocarbyl or aliphatic hydrocarbyl substituted with up to 2 substituents of the group consisting of hydroxy, lower acyloxy, lower alkoxy, or tetrahydropyranyloxy; $R^f$ and $R^g$, when taken together, are oxo; and Z is hydrogen or lower alkyl.

By the term "lower acyloxy" is meant a radical derived from an aliphatic carboxylic acid of up to about 11 carbons by removal of the hydrogen of the carboxyl group. The acid may be saturated or unsaturated, straight or branched chain, and may contain one or more substituents, such as halo, including chloro and fluoro, nitro, oxy, and the like. Suitable acids include formic acid, acetic acid, propionic acid, trimethylacetic acid, caproic acid, enanthic acid, hendeanoic acid, phenylacetic acid benzoi acid, cyclopentylpropionic acid, trifluoroacetic acid, aminoacetic acid, oxypropionic acid, adipic acid, and the like. Preferred are hydrocarbyl acyclic mono-basic acids of up to about 6 carbons, with alkanoic monocarboxylic acids being especially preferred.

By the terms "lower alkyl" and "lower alkoxy" are meant alkyl and alkoxy groups of up to about 6 carbons, such as methyl, ethyl, propyl, isopropyl, butyl, tert.-butyl, hexyl, methoxy, ethoxy, tert.-butoxy, and the like.

By the term "lower alkylenedioxy group" is meant a divalent radical of the formula $-OR^iO-$, wherein $R^i$ is an alkylene, i.e., a divalent saturated acyclic hydrocarbon, radical of up to about 10 carbons, and preferably up to about 6 carbons. Especially preferred are alkylidenedioxy groups, with isopropylidenedioxy being most preferred.

By the term "aliphatic hydrocarbyl group" is meant a monovalent radical free of aromatic unsaturation and consisting of carbon and hydrogen, such as alkyl, alkenyl, alkynyl, alkadienyl, and the like, and may be either branched or straight chain. Preferred aliphatic hydrocarbyl groups are alkyl groups and alkynyl groups of up to about 6 carbons, such as ethynyl, propyl, isopropyl, butyl, isobutyl, butynyl, pentyl, isopentynyl, and the like, with branched-chain groups being preferred. Preferred substituted aliphatic hydrocarbyl groups are those represented by the formula $-CH(OH)R^h$, wherein $R^h$ is aliphatic hydrocarbyl of up to about 5 carbons, preferably branched chain, and especially branched alkyl or alknyl, which may be substituted with a hydroxy group, a lower alkyl group, a lower alkoxy group, or a tetrahydropyranyl group.

The novel products of this invention are illustrated by the following formulae:

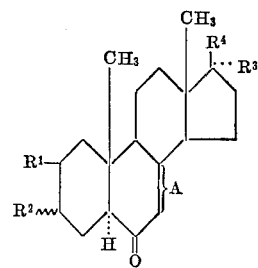

(II)

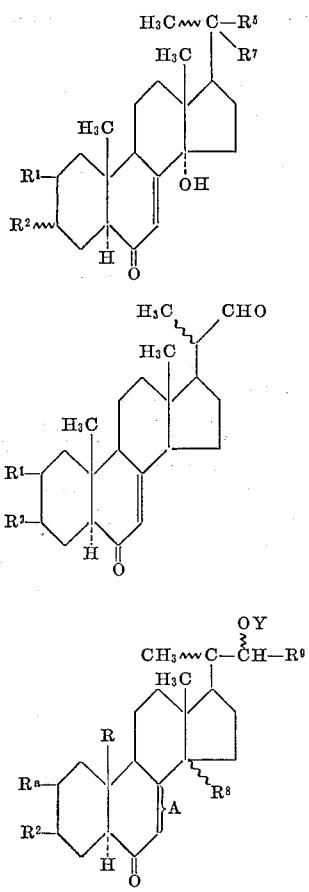

(III)

(IV)

(V)

wherein:

R and $R^a$ are as defined above;

$R^1$ and $R^2$, each when taken alone, is hydroxy, lower acyloxy, or lower alkoxy, and $R^1$ and $R^2$ can be the same or different;

$R^1$ and $R^2$, when taken together, and $R^2$ is in the β-orientation, are lower alkylenedioxy;

A is as defined above;

$R^3$ is hydrogen or lower alkyl;

$R^4$, when $R^3$ is lower alkyl, is hydroxy or lower acyloxy, and when $R^3$ is hydrogen, is hydrogen, lower acyloxy, or a radical of the formula —$C(CH_3)R^5R^6$;

$R^5$, when taken alone, is hydrogen or hydroxy;

$R^6$, when taken alone, is —$CO_2Z$, —CHO,

—CH(O-lower alkyl)$_2$

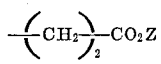

aliphatic hydrocarbyl, or aliphatic hydrocarbyl substituted with up to two substituents of the group consisting of hydroxy, lower acyloxy, lower alkoxy, or tetrahydropyranyloxy;

$R^7$, when taken alone, and when $R^5$ is hydrogen, is —$CO_2Z$, —CHO, —CH(O-lower alkyl)$_2$,

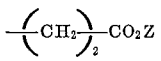

or aliphatic hydrocarbyl, and when $R^5$ is hydroxy, is $R^6$;

$R^5$ and $R^6$, when taken together, are oxo;

$R^5$ and $R^7$, when taken together, are oxo;

Z is hydrogen or lower alkyl;

$R^8$, when A represents a single bond, is hydrogen, and when A represents a double bond, is hydrogen or hydroxy;

Y is hydrogen, lower alkyl, or lower acyl; and $R^9$ is aliphatic hydrocarbyl or aliphatic hydrocarbyl substituted with up to one substituent of the group consisting of hydroxy, lower acyloxy, lower alkoxy, or tetrahydropyranyloxy.

An especially preferred class of compounds of this invention are those defined by the formula:

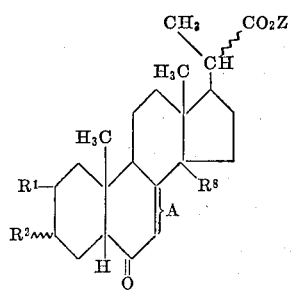

(VI)

wherein $R^1$, $R^2$, $R^8$, A, and Z are as defined above.

It is also within the contemplation of the present invention that the steroids of Formulae I–VI may have substituents or unsaturated carbon-carbon bonds other than those specifically depicted. For example, a lower alkyl group may be present on the 1-, 7-, or 16-positions, a hydroxy or lower acyloxy group may be present in the 1-, 11-, 16-, or 17-positions, and double bonds may be present in the 1(2)- and/or the 3(4)-positions.

The production of 5β-H-steroids of the type defined by Formulae II, III, and VI is unexpected in view of the teachings of A. Schubert, J. Org. Chem., 26, 159 (1964); H. B. Henbest, J. Chem. Soc., 1967, 4596 and 4765; and N. L. Allenger, J. Org. Chem., 26, 3626 (1961). These publications disclose that 5β-H-6-ketosteroids which are unsubstituted in the 2-position are isomerized under acidic or basic conditions to the corresponding 5α-H-steroids, thus leading to the conclusion that the A/B-trans-ring linkage is the more stable form for 6-ketosteroids. Unexpectedly, it has been discovered by this invention that 6-ketosteroids substituted in both the 2- and 3-positions with hydroxy groups or esterified or etherified hydroxy groups and having an A/B-cis-ring linkage are stable.

The various products of this invention are obtained by both known and novel reactions from known starting materials such as Δ²-cholesten-6-one, methyl 3,3-ethylenedioxy - Δ⁵ - pregnen - 20 - carboxylate, 3 - hydroxy - Δ⁷-cholesten - 6 - one, 3 - acetoxy - Δ⁷,²² - ergostadien - 6-one, 3α - hydroxy - 20,20 - ethylenedioxy - 5α - H - pregnan - 6 - one, 3,3 - ethylenedioxy - 20 - hydroxymethyl-Δ⁵-pregnen, and the like.

A major novel reaction employed in producing the products of this invention comprises the conversion of a 2β,3-dihydroxy-5α-H-6-ketosteroid or a mono- or diester or mono- or diether thereof to the corresponding 5β-H-compound; i.e., by effecting isomerization at the 5-position, as is illustrated by Equation A, employing partial formulas for starting material and product:

Equation A

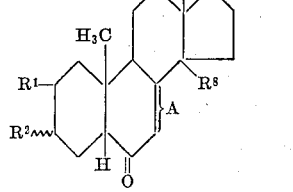

wherein B represents the remainder of the steroid nucleus. This process is particularly useful for producing a compound of Formula II above from the corresponding 5α-H-steroid.

The isomerization is effected by the introduction of energy such as by thermal energy, irradiation, and the like, preferably in the presence of an inert organic solvent. Suitable solvents include alcohols such as methanol and ethanol; ethers such as diethyl ether, diisopropyl ether, tetrahydrofuran, and dioxane; ketones such as acetone and methyl ethyl ketone; esters such as ethyl acetate; hydrocarbons such as benzene; chlorinated hydrocarbons such as chloroform; and the like.

The introduction of thermal energy is effected by heating at elevated temperatures, such as at about 50° C. or higher, and preferably in the range of from about 60 to about 80° C. The presence of acidic or basic catalysts, heretofore known as isomerization catalysts, promotes the rate of isomerization and permits the use of lower temperatures. Suitable acid catalysts include sulfuric acid, perchloric acid, selenous acid, p-toluene-sulfonic acid, and Lewis acids such as boron trifluoride, magnesium bromide, mercury chloride, aluminum chloride, and the like. Basic catalysts which can be employed include inorganic bases such as alkali metal hydroxides, for example, sodium hydroxide or potassium hydroxide, and alkaline earth metal hydroxides, for example, calcium hydroxide or magnesium hydroxide; as well as basic salts such as potassium carbonate, and the like; and organic bases such as triethylamine, benzltrimethylammonium hydroxide, pyridine, or lutidine. In addition, acidic or basic adsorption agents such as aluminum oxide or silica gel will also catalyze the isomerization.

The acidic or basic reaction medium, in addition to catalyzing the isomerization at the 5-position, can also be employed to promote other structural changes in the steroid. For example, selenium dioxide (selenous acid), which is employed to introduce a hydroxy group in the 14α-position, as hereinafter described, is sufficiently acidic to effect isomerization of the 5α-hydrogen to the 5β-hydrogen.

The temperature and reaction time necessary to achieve the isomerization will vary depending upon the catalyst, but suitable temperatures and times can be readily determined by those having ordinary skill in the art. For example, at 60–80° C. times of about 4 hours are normally employed when hydrochloric acid is employed as the catalyst, whereas about 1 hour is sufficient when potassium hydroxide is employed. On the other hand, isomerization occurs at 0° C. in less than 1 hour when boron trifluoride is the catalyst.

The isomerization of this invention may also be effected by the use of ultraviolet radiation, by which term is meant light having a wave length of less than about 4000 Angstrom units.

The product of the isomerization, if conducted for a sufficient length of time, is an equilibrium mixture of the 5α-H- and 5β-H-isomers in approximately equimolar amounts. At short times and/or with weak catalysts, less than an equimolar ratio of 5β-H- to 5α-H-steroid is produced. These isomers may be separated, however, by techniques known to the art such as chromatography, fractional crystallization, and the like. In addition, when the isomerization product is a 2β,3β-dihydroxy compound, the isomers may be separated by reaction with acetic anhydride. The 5β-H-isomer readily forms a 2β,3β-acetate, whereas the 5α-H-isomer forms a 2β-hydroxy-3β-acetate. The diacetate is normally less soluble than the monoacetate and thus can be readily precipitated from the reaction mixture. The 5α-H-monoacetate, which remains in solution, can then be subjected to a second isomerization in accordance with this invention.

The products of this process can be hydrolyzed or acylated, if desired, by known reaction techniques. Furthermore, compounds wherein $R^1$ and $R^2$, when taken together are alkylenedioxy, are readily formed by the acid-catalyzed reaction of a 2β,3β-dihydroxy compound with a ketone, for example, acetone.

A second novel reaction of this invention, and one which is related to the above-described isomerization, comprises the conversion of a 2β,3β-dihydroxy-5α-H-6-keto-Δ⁷-steroid which is unsubstituted in the 14-position or a mono- or diether or mono- or diester thereof to the corresponding 5β-H-14α-hydroxysteroid, as is illustrated by Equation B:

EQUATION B

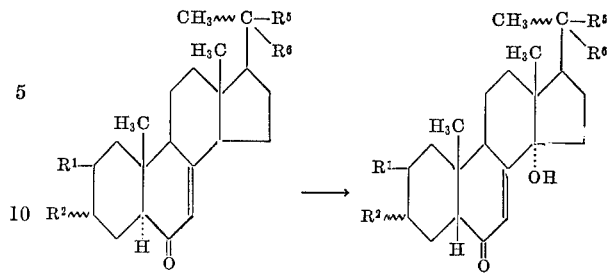

This reaction is effected by the use of selenium dioxide, and is normally conducted in an inert solvent such as those discussed above. The reaction temperature is not narrowly critical, although elevated temperatures, preferably of from about 50 to about 120° C., are normally employed. The product 5β-H-14α-hydroxysteroid is recovered from the reaction medium by conventional techniques.

Still another novel technique for producing 2β,3-dihydroxy-5β-H-6-ketosteroids or mono- or diethers or mono- or diesters thereof comprises the acid-catalyzed isomerization of a corresponding 5,6-oxidesteroid, as is illustrated by Equation C:

EQUATION C

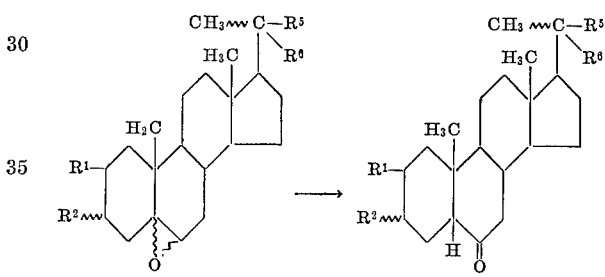

The oxirane ring of the starting material of this process may be in either the α- or β-orientation. Suitable acid catalysts are those discussed above with reference to the 5α-H- to 5β-H-isomerization. This reaction is normally effected in the presence of an inert organic solvent such as those discussed above. The reaction temperature is not narrowly critical, although it is preferred to employ realtively low temperatures, especially those in the range of from about −10° C. to about +30° C.

Still another novel transformation useful in producing a 2β,3β-dihydroxy-5β-H-6-ketosteroid is that proceeding from a 3,6-dioxo-5α-H-steroid by a series of reactions illustrated by Equations D, E, and F, employing partial formulas:

EQUATION D

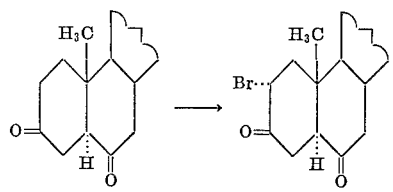

EQUATION E

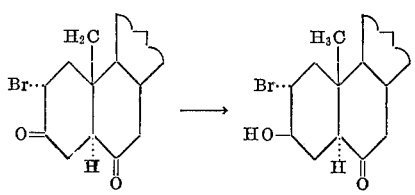

EQUATION F

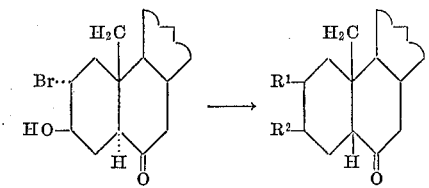

EQUATION G

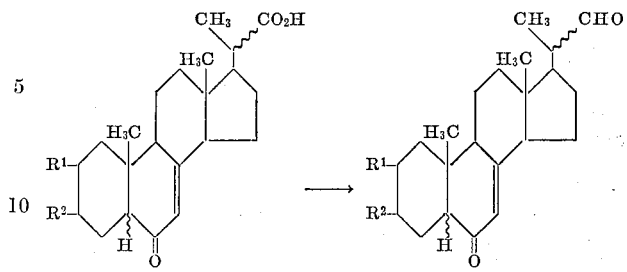

The reaction steps outlined above are novel and yield unexpected results both individually and in combination. This sequence is especially valuable for producing compounds of Formula II wherein A represents a single bond.

In the first step of this reaction sequence (Equation D), a 3,6-dioxo-5α-H-steroid is brominated by generally known techniques to produce a 2α-bromo-3,6-dioxo-5α-H-steroid. This result is unexpected in view of the disclosure of L. H. Sarett, J. Org. Chem. 8, 405 (1943) that the bromination of 3,6-cholanedione, a 5β-H-steroid, yields a mixture of polybromo compounds.

The bromination of this invention is effected by reacting the 3,6-diketosteroid with bromine in any suitable manner. A preferred procedure comprises dissolving the 3,6-ketosteroid in a solvent which is inert towards bromine, such as tetrahydrofuran, dioxane, ether, benzene, or chloroform, and subsequently adding to this solution a solution of bromine in acetic acid dropwise at reduced temperature, i.e., below about room temperature (20–25° C.). On completion of the bromination, free hydrogen bromide produced by the reaction is neutralized, as by the addition of a buffer such as potassium acetate.

In the second step of this novel reaction sequence (Equation E), the 3-keto group of the 2α-bromo-3,6-diketosteroid is selectively reduced by reaction of the steroid with a lithium tri(lower alkoxy)aluminum hydride, preferably a lithium tri(tert.-lower alkoxy)aluminum hydride, such as lithium tri(tert.-butoxy)aluminum hydride or lithium tri(tert.-amyloxy)aluminum hydride. This reduction is effected in an inert organic solvent such as dioxane, tetrahydrofuran, or ether, and is preferably effected at reduced temperatures, especially in the range of from about —5 to about +15° C. The production of a 3β-hydroxy-6-ketosteroid in this manner is entirely unexpected, for it could not be foreseen that the 3,6-diketo system would be susceptible to selective reduction. Furthermore, if one were to predict which of the two keto groups would be more likely to be reduced, the free-standing 6-keto group would appear to be the most susceptible to preferential reduction. This is because attack at the 3-keto group by the bulky lithium tri(lower alkoxy)aluminum hydride compounds would be expected to be sterically hindered by the 2α-bromo atom.

The final reaction step of this sequence (Equation F) comprises the replacement of the 2α-bromo atom with a 2β-acyloxy group, employing generally known techniques but leading to the unexpected 5β-H-steroids. In a preferred technique, the 2α-bromo-3β-hydroxysteroid produced by the above-described selective reduction is esterified to form a 2α-bromo-3β-acyloxysteroid, which is then reacted with an alkali metal acylate or a silver acylate, preferably an acetate, and most desirably silver acetate. This reaction is normally effected at elevated temperatures, preferably in the range of from about 75° C. to about 125° C. As with the previously described 5α-H- to 5β-H-isomerization, the product of this reaction is a mixture of 5α- and 5β-H-isomers, which may be readily separated by known techniques.

A further novel reaction sequence of this invention comprises the conversion of a 2β,3β-dihydroxy-6-keto-Δ⁷-pregnen-20-carboxylic acid to the corresponding aldehyde, as is illustrated by Equation G:

This conversion is effected by first reacting the acid, the hydroxy groups of which are preferably protected, as by conversion to acyloxy, alkoxy, or alkylenedioxy groups, with carbonyl diimidazole in accordance with known procedures to form an imidazolide. This product is then reacted with a lithium tri(lower alkoxy)aluminum hydride to effect selective conversion of the imidazolide group to the formyl group. This reaction is unexpected because the normally used reducing agent, lithium aluminum hydride, is known to effect reduction of keto groups and elimination of ester groups. The reaction is preferably conducted in the absence of free oxygen, as in an argon or nitrogen atmosphere. The reaction temperature is not narrowly critical, although temperatures of about room temperature (20–25° C.) are normally employed. The reaction is generally effected in the presence of an inert organic solvent such as those previously discussed above.

A final novel process of the present invention comprises the conversion of a 20-formylpregnan-6-one to a 20-(1-hydroxy-hydrocarbyl)-pregnan-6-one, as is illustrated by Equation H:

EQUATION H

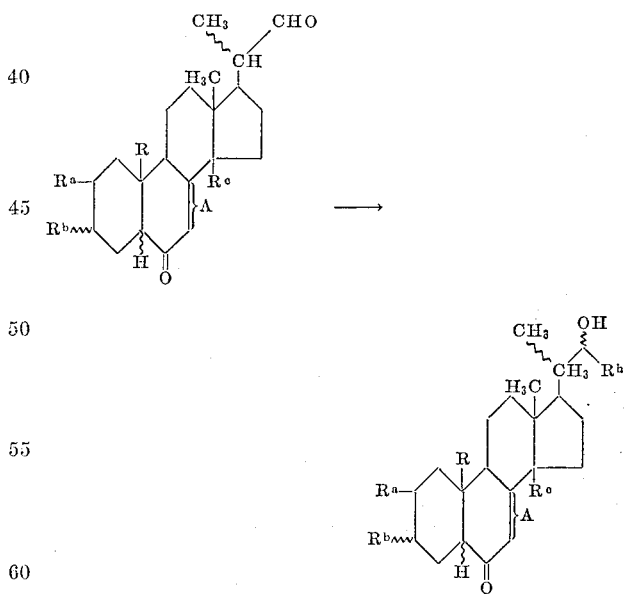

This reaction is effected by reacting the 20-formyl compound with a Grignard reagent having the formula:

$$R^hMgX$$

wherein $R^h$ is as defined above and X is chlorino, bromine, or iodine. This conversion is effected in the presence of an inert solvent such as those previously disclosed and preferably an ether such as tetrahydrofuran, ether, dioxane, or the like. The temperature of the reaction is not narrowly critical, but reduced temperatures, preferably in the range of from about —5° C. to about +15° C. and more especially about 0–5° C., are employed to ensure as quantitative and selective a reaction as possible.

In a preferred technique, a solution of the Grignard reagent is slowly added with stirring to a solution of the 20-formyl compound. The selective reaction with the 20-formyl group without attack on the 6-keto group or an acyl group is unexpected, for it is well known that Grignard reagents readily react with such groups. The reaction time is not narrowly critical, and the reaction is generally complete after about 5 to 10 minutes under the foregoing conditions. However, the reaction period can be permitted to extend as long as about 30 or even about 60 minutes without the occurrence of significant side reactions.

When $R^h$ is an unsaturated group, the unsaturated side chain may be selectively hydrogenated over a metal catalyst, such as palladium, and preferably platinum dioxide, employed as such or deposited on conventional supports. The hydrogenation is preferably effected in a solvent for the steroid such as a lower alcohol, for example, methanol or ethanol; an ether, for example, diethyl ether, dioxane, or tetrahydrofuran; an ester, for example, ethyl acetate; or a hydrocarbon, for example, benzene. Carboxylic acids, such as acetic acid, are not desirable because they promote the reduction of the 6-keto group as well as the $\Delta^7$-bond, if present.

When a 14α-hydroxy compound is desired as the product, the hydrogenation should be effected prior to the introduction of the 14α-hydroxy group because of the tendency of the hydrogenation to effect at least partial elimination of this group. Alternatively, the Grignard reaction may be effected with a reagent wherein $R^h$ is already saturated.

The 14α-hydroxylation may be effected by known techniques, as well as by the previously described reaction with selenous acid, which may be effected with either a 5α-H- or a 5β-H-steroid. Additionally, 14α-hydroxylation may be effected by biochemical methods, as by the action of microorganisms and/or the enzymes formed by them. Suitable systems include enzymes of the type Curvularia, preferably *Curvularia lunata*, the type Absidia, preferably *Absidia regnieri*, and especially of the type Heliocostylum, preferably *Heliocostylum piriforme*, or the type Mucor, preferably *Mucor griseo-cyanus*.

As indicated above, the various products of this invention possess activity as insect metamorphosis hormones. Thus, the products of this invention may be employed to induce insect metamorphosis at a point in time which is detrimental to the further population of the insect. Because of the hormonal nature of these products, a resistance to their action cannot develop, thus avoiding a significant disadvantage of conventional insecticides. In addition to their metamorphosis-inducing activity, the products of this invention possess a profound influence on the cell metabolism in other animals, especially in warm-blooded animals or crustaceans. For example, by the use of the products of this invention, it is possible to induce the moulting stage in crustaceans, thus rendering them suitable as fish bait. Additionally, the products of this invention can be employed to control crustacean infestation and the damage caused thereby by inducing the moulting stage and exposing the crustacean to natural decimation. Furthermore, the products of this invention have been observed to have central nervous system activity. It is thus readily apparent that the products of this invention have wide utility as pharmaceuticals in hormone and veterinary medicine as well as use as agents for the control of insects in agricultural applications. Furthermore, many of the products of this invention serve as intermediates for the manufacture of still other valuable medicinal or agricultural agents.

The products of this invention can be employed in the form of preparations which contain them in admixture with suitable organic or inorganic inert carrier materials such as, for example, water, starch, magnesium stearate, talc, vegetable oils, polyalkylene glycol, or the like.

The following examples are illustrative. For convenience in following the reaction sequences employed, each example is limited to the production of derivatives of a single known starting material, but may illustrate the production of several of the products of this invention as well as the use of one or more of the novel processes of this invention. It is to be understood, however, that these examples are not limited to the specific starting materials or sequences employed, and that other starting materials and reactions known to the art may be used where desired.

EXAMPLE I.—FROM $\Delta^2$-CHOLESTEN-6-ONE (A) Synthesis of 2β-acetoxy-3β-hydroxy-5α-cholestan-6-one To a solution of 2 grams of 5α-$\Delta^2$-cholesten-6-one in 270 milliliters of glacial acetic acid and 3.7 milliliters of water, there was added 3.2 grams of silver acetate and, with intensive stirring, 1.9 grams of iodine. The resulting reaction mixture was heated with stirring at 45° C. for 3 hours, treated with an excess of common salt, stirred for an additional 5 minutes, and then filtered. The deep red filtrate was then evaporated to dryness under vacuum and the residue was taken up in ethyl acetate, washed in sequence with water, thiosulfate solution, and again with water, dried over sodium sulfate, and concentrated to obtain 2β-acetoxy-3β-hydroxy-5α-cholestan-6-one, melting point 217–218° C. (from methylene chloride/acetonitrile).

(B) Synthesis of 2β,3β-dihydroxy-5α-cholestan-6-one

An admixture of 2.2 grams of 2β-acetoxy-3β-hydroxy-5α-cholestan-6-one and 1.1 grams of potassium carbonate in 200 milliliters of absolute methanol was stirred at room temperature for 15 hours. The reaction solution was thereafter concentrated in vacuum. The residue, after being taken up in ethyl acetate, was washed with water, thiosulfate solution, and again with water, dried, and concentrated to obtain 2β,3β-dihydroxy-5α-cholestan-6-one, melting point 212–213° C. (from acetonitrile).

(C) Synthesis of 2β,3β-diacetoxy- and 2β,3β-dihydroxy-5β-cholestan-6-one (1) FROM 2β,3β-DIHYDROXY-5α-CHOLESTAN-6-ONE (a) Acid-catalyzed reaction.—A solution of 500 milligrams of 2β,3β-dihydroxy-5α-cholestan-6-one in 20 milliliters of ethanol and 5 milliliters of 3 N hydrochloric acid was heated at boiling for 4 hours. After cooling and dilution with water, the reaction solution was extracted with chloroform. The extract was washed with water, dried over sodium sulfate and concentrated in vacuum to yield 2β,3β-dihydroxycholestan-6-one as an approximately equimolar mixture of the 5α-H- and 5β-H-isomers.

(b) Base-catalyzed reaction.—A mixture of 600 milligrams of 2β,3β-dihydroxy-5α-cholestan-6-one, 500 milligrams of potassium hydroxide and 10 milliliters of methanol was heated at reflux for one hour. After cooling, the reaction mixture was treated with water and extracted with chloroform. After workup of the extract, there was obtained 2β,3β-dihydroxycholestan-6-one as an approximately equimolar mixture of the 5α-H- and 5β-H-isomers.

(2) FROM 2β-ACETOXY-3β-HYDROXY-5α-CHOLESTAN-6-ONE (a) Acid-catalyzed reaction.—A solution of 1 gram of 2β-acetoxy-3β-hydroxy-5α-cholestan-6-one in 40 milliliters of ethanol and 10 milliliters of 3 N hydrochloric acid was heated at reflux for 4 hours. After cooling, the reaction mixture was diluted with water and extracted with ethyl acetate. The extract was worked up to yield 2β,3β-dihydroxycholestan-6-one as an approximately equimolar mixture of the 5α-H- and 5β-H-isomers.

(b) Base-catalyzed reaction.—A mixture of 1 gram of 2β-acetoxy-3β-hydroxy-5α-cholestan-6-one and 1 gram of potassium hydroxide in 20 milliliters of methanol was heated at reflux for 2 hours. After cooling, the reaction mixture was diluted with water and extracted with ethyl acetate. After workup of the extract, there was obtained 2β,3β-dihydroxy cholestan-6-one as an approximately equimolar mixture of the 5α-H- and 5β-H-isomers.

(3) ISOLATION OF 2β,3β-DIACETOXY-5β-CHOLESTAN-6-ONE

A solution of 1 gram of 2β,3β-dihydroxycholestan-6-one-5-H-isomeric mixture produced as described above in 20 milliliters of acetic anhydride and 10 milliliters of pyridine was allowed to stand overnight at room temperature. After the addition of ice and extraction with chloroform, the extract was washed first with dilute hydrochloric acid and then water. The extract was then dried over sodium sulfate and concentrated in vacuum to yield 2β,3β-diacetoxy-5β-cholestan-6-one, melting point 148–149° C. (from petroleum ether).

(4) ISOLATION OF 2β,3β-DIHYDROXY-5β-CHOLESTAN-6-ONE

A solution of 1 gram of 2β,3β-diacetoxy-5β-cholestan-6-one in 100 milliliters of absolute methanol was treated with 0.5 gram of potassium carbonate and stirred overnight at room temperature. The resulting reaction mixture was poured into water and extracted with chloroform. After workup of the extract, there was obtained 2β,3β-dihydroxy-5β-cholestan-6-one, melting point 167–168° C. (from acetonitrile and acetone).

(D) Synthesis of 2β,3β-isopropylidenedioxy-5β-cholestan-6-one

There was added 7 grams of calcium chloride to a solution of 1.3 grams of 2β,3β-dihydroxy-5α-cholestan-6-one in 70 milliliters of acetone containing 1 percent hydrochloric acid. The resulting reaction mixture was stirred for 16 hours at room temperature and then poured into water. After extraction with ethyl acetate, washing the extract with water, dilute sodium bicarbonate solution and again with water, drying the extract and evaporation of the solvent, there was obtained 2β,3β-isopropylidenedioxy-5β-cholestan-6-one, melting point 171° C. (from acetonitrile).

EXAMPLE II.—FROM 3β-HYDROXY-Δ⁷-CHOLESTEN-6-ONE (A) Synthesis of 2β-acetoxy-3β-hydroxy-5α-Δ⁷-cholesten-6-one A mixture of 11 grams of 3β-hydroxy-5α-Δ⁷-cholesten-6-one, 15 grams of p-toluenesulfonic acid, and 250 milliliters of pyridine was stirred at room temperature for 24 hours and then poured into ice water. The precipitate which formed was filtered off and dissolved in methylene chloride. The resulting solution was washed with water, dried over sodium sulfate and evaporated to dryness. Upon recrystallization of the residue from diisopropyl ether, there was obtained 3β-tosyloxy-5α-Δ⁷-cholesten-6-one, melting point 153–154° C.

A mixture of 4 grams of 3β-tosyloxy-5α-Δ⁷-cholesten-6-one, 1 gram of lithium bromide, 1.5 grams of lithium carbonate, and 200 milliliters of dimethylformamide was heated at 120° C. for 5 hours. After cooling, the reaction mixture was poured into ice water and weakly acidified with hydrochloric acid. The resulting precipitate was filtered off and dissolved in methylene chloride. The resulting solution was washed with water, dried and concentrated to yield 5α-Δ²,⁷-cholestadien-6-one.

The thus-produced 5α-Δ²,⁷-cholestadien-6-one was dissolved in 250 milliliters of acetic acid at 60° C. Thereafter, there was added in sequence 3.9 milliliters of water, 3.1 grams of silver acetate, and 2 grams of finely ground iodine. The resulting reaction mixture was heated at 60° C. with vigorous stirring for 5 hours. After treating with an excess of common salt and stirring for an additional 5 minutes, the reaction mixture was filtered. The deep red filtrate was concentrated to dryness under vacuum. The residue was taken up in ether and the ether solution was washed with water, bicarbonate solution, and again with water, and thein dried and concentrated. After recrystallization of the residue from diisopropyl ether, there was obtained 2β-acetoxy-3β-hydroxy-5α-Δ⁷-cholesten-6-one, melting point 215–217.5° C.

(B) Synthesis of 2β,3β-hydroxy-5α-Δ⁷-cholesten-6-one

A mixture of 1 gram of 2β-acetoxy-3β-hydroxy-5α-Δ⁷-cholesten-6-one and 1 gram of potassium carbonate in 100 milliliters of methanol was stirred at room temperature for 40 minutes. After pouring the resulting reaction mixture into water, the precipitate which had formed was filtered off and dissolved in methylene chloride. Workup of this solution gave 2β,3β-dihydroxy-5α-Δ⁷-cholesten-6-one, melting point 208–210° C. (from acetone).

(C) Synthesis of 2β,3β-diacetoxy- and 2β,3β-dihydroxy-5β-Δ⁷-cholesten-6-one (1) FROM 2β,3β-DIHYDROXY-5α-Δ⁷-CHOLESTEN-6-ONE (a) Acid-catalyzed reaction.—A mixture of 500 milligrams of 2β,3β-dihydroxy-5α-Δ⁷-cholesten-6-one in 25 milliliters of ethanol and 5 milliliters of 3 N hydrochloric acid was heated at boiling for 20 hours. After cooling, the mixture was poured into ice water and the precipitate which formed was separated and taken up in methylene chloride. The organic solution was washed with water, dried with sodium sulfate and concentrated in vacuum. On recrystallization of the residue from diisopropyl ether, there was obtained 2β,3β-dihydroxy-Δ⁷-cholesten-6-one as an approximately equimolar mixture of the 5α-H- and 5β-H-isomers.

(b) Base-catalyzed reaction.—A mixture of 500 milligrams of 2β,3β-dihydroxy-5α-Δ⁷-cholesten-6-one, 500 milligrams of potassium hydroxide and 20 milliliters of methanol was heated under reflux for 2 hours. After cooling, pouring the reaction mixture into ice water and workup of the resulting precipitate as described above, there was obtained 2β,3β-dihydroxy-Δ⁷-cholesten-6-one as a mixture of the 5α-H- and 5β-H-isomers.

(2) FROM 2β-ACETOXY-3β-HYDROXY-5α-Δ⁷-CHOLESTEN-6-ONE (a) Acid-catalyzed reaction.—A mixture of 1 gram of 2β-acetoxy-3β-hydroxy-5α-Δ⁷-cholesten-6-one in 50 milliliters of ethanol and 10 milliliters of 3 N hydrochloric acid was heated at boiling for 20 hours. After cooling and pouring the reaction mixture into ice water, the precipitate which had formed was separated and taken up in methylene chloride. After workup of the organic solution, there was obtained 2β,3β-dihydroxy-Δ⁷-cholesten-6-one as a mixture of the 5α-H- and 5β-H-isomers (b) Base-catalyzed reaction.—A mixture of 500 milligrams of 2β-acetoxy-3β-hydroxy-5α-Δ⁷-cholesten-6-one and 500 milligrams of potassium hydroxide in 30 milliliters of methanol was heated under reflux for 4 hours. After cooling the reaction mixture and pouring it into ice water, the precipitate which had formed was separated out and worked up as described above to obtain 2β,3β-dihydroxy-Δ⁷-cholesten-6-one as a mixture of the 5α-H- and 5β-H-isomers.

(3) ISOLATION OF 2β,3β-DIACETOXY-5β-Δ⁷-CHOLESTEN-6-ONE

A solution of 1 gram of 2β,3β-dihydroxy-Δ⁷-cholesten-6-one-5-H-isomeric mixture produced as described above in 30 milliliters of acetic anhydride and 15 milliliters of pyridine was held at room temperature for 4 hours. The resulting reaction mixture was poured into ice water and extracted with methylene chloride. The organic extract was washed with dilute sulfuric acid and water, dried and concentrated. After recrystallization from pentane, there was obtained 2β,3β-diacetoxy-5β-Δ⁷-cholesten-6-one, melting point 166–168° C.

(4) PRODUCTION OF 2β,3β-DIHYDROXY-5β-Δ⁷-CHOLESTEN-6-ONE

A mixture of 1 gram of 2β,3β-diacetoxy-5β-Δ⁷-cholesten-6-one, 1 gram of potassium carbonate, and 100 milliliters of methanol was stirred at room temperature for 40 minutes. The resulting reaction mixture was poured into water and the aqueous mixture was extracted with methylene chloride. The organic phase was washed with water, dried, and concentrated to obtain 2β,3β-dihydroxy-5β-Δ$^7$-cholesten-6-one, melting point 207–209° C. (from diisopropyl ether).

(D) Synthesis of 2β,3β-isopropylidene-5β-Δ$^7$-cholesten-6-one

A solution of 400 milligrams of 2β,3β-dihydroxy-5α-Δ$^7$-cholesten-6-one in 100 milliliters of acetone was cooled to 0° C., treated with one drop of boron trifluoride etherate and held at 0° C. for 15 minutes. The resulting reaction mixture was poured into water, extracted with methylene chloride, and the methylene chloride phase was washed with water, dried and concentrated to obtain 2β,3β-isopropylidenedioxy-5β-Δ$^7$-cholesten-6-one, melting point 163–163.5° C. (from methanol).

(E) Synthesis of 2β,3β,14α-trihydroxy-5β-Δ$^7$-cholesten-6-one (1) INTRODUCTION OF THE 14α-HYDROXY GROUP FOLLOWED BY ISOMERIZATION Employing procedures similar to those described in Example IA(3), 2β-acetoxy-3β-hydroxy-Δ$^7$-cholesten-6-one was acetylated to 2β,3β-diacetoxy-5α-Δ$^7$-cholesten-6-one, melting point 196–198° C. (from methanol). Employing techniques similar to those described in Example IV below, this product was reacted with selenium dioxide in dioxane to produce 2β,3β-diacetoxy-14α-hydroxy-5α-Δ$^7$-cholesten-6-one, melting point 231–232° C. (from methanol). Employing procedures similar to those described in Example IC(2), the thus-obtained product was isomerized with potassium hydroxide in methanol. After workup there was obtained 2β,3β,14α-trihydroxy-5β-Δ$^7$-cholesten-6-one, melting point 207–209° C. (from ether/hexane).

In the manner described in Example IC(3) above, the above-obtained 2β,3β,14α-trihydroxy-compound was reacted with acetic anhydride in pyridine to produce 2β,3β-diacetoxy - 14α - hydroxy-5β-Δ$^7$-cholesten-6-one, melting point 189–191° C. (from isopropyl ether).

(2) SIMULTANEOUS 14α-HYDROXYLATION AND ISOMERIZATION

A solution of 1 gram of 2β-acetoxy-3β-hydroxy-5α-Δ$^7$-cholesten-6-one in 100 milliliters of absolute dioxane was heated at 80° C. To this solution was added two 1-gram portions of freshly sublimed selenium dioxide over a 30-minute period. The resulting mixture was heated an additional 2½ hours at 80° C. with stirring. After filtration of the reaction mixture, the filtrate was concentrated under vacuum and mixed with water. The precipitate which formed was separated and dissolved in methylene chloride. The resulting organic solution was washed with water, dried over sodium sulfate and evaporated to obtain 2β-acetoxy-3β,14α - dihydroxy-5β-Δ$^7$-cholesten-6-one, melting point 260–261° C. (from diethyl ether).

EXAMPLE III.—FROM 3β-ACETOXY-Δ$^{7,22}$-ERGOSTADIEN-6-ONE (A) Synthesis of 2β-acetoxy-3β-hydroxy-5α-Δ$^{7,22}$-ergostadien-6-one A mixture of 11.7 grams of 3β-acetoxy-Δ$^{7,22}$-5α-ergostadien-6-one, 11.7 grams of potassium carbonate and 2 liters of methanol was heated at boiling for 30 minutes. The resulting reaction mixture, after cooling, was poured into water and the organic phase was washed, dried, and concentrated.

The crude saponification product, in admixture with 200 milliliters of pyridine and 13.5 grams of p-toluenesulfonyl chloride, was held at room temperature for 24 hours. After dilution of the reaction mixture with water, the precipitate which had formed was separated off and dissolved in methylene chloride. The organic solution was washed, dried and concentrated to yield 3β-tosyloxy-Δ$^{7,22}$-5α-ergostadien-6-one which, after crystallization from diisopropyl ether, melted at 148–149° C.

A mixture of 2.2 grams of 3β-tosyloxy-Δ$^{7,22}$-5α-ergostadien-6-one in 10 milliliters of dimethylaniline was heated at 200° C. for 20 minutes. After cooling, the reaction solution was poured into dilute sulfuric acid, and the precipitate which formed was filtered off by suction and taken up in chloroform. The organic solution was washed until neutral, dried and concentrated to yield Δ$^{2,7,22}$-5α-ergostatrien-6-one.

After dissolving the crude product in 130 milliliters of acetic acid at 45° C., there was successively added 2.1 milliliters of water, 1.8 grams of silver acetate and 1.09 grams of finely powdered iodine. The resulting mixture was heated with vigorous stirring at 45° C. for 50 minutes. After the addition of an excess of common salt, the reaction mixture was stirred for an additional 5 minutes, filtered and the filtrate concentrated to dryness in vacuum. The residue was purified by preparative thin layer chromatography, and after recrystallization from diisopropyl ether, there was obtained 2β-acetoxy-3β-hydroxy-Δ$^{7,22}$-5α-ergostadien-6-one, melting point 208–210° C.

(B) Synthesis of 2β,3β-dihydroxy- and 2β,3β-diacetoxy-5β-Δ$^{7,22}$-ergostadien-6-one A solution of 2.1 grams of 2β-acetoxy-3β-hydroxy-Δ$^{7,22}$-5α-ergostadien-6-one in 100 milliliters of ethanol and 20 milliliters of 3 N hydrochloric acid was heated at boiling for 20 hours. After cooling, the reaction mixture was diluted with water and the precipitate which formed was separated and taken up in methylene chloride. The organic solution was washed with water, dried over sodium sulfate and concentrated in vacuum to obtain 2β,3β-dihydroxy-Δ$^{7,22}$-5β-ergostadien-6-one as an oil.

The diol was acetylated at room temperature for 16 hours by reaction with 5 milliliters of pyridine and 2.5 milliliters of acetic anhydride. The resulting reaction mixture was diluted with water and the precipitate which formed was filtered off and dissolved in methylene chloride. After washing until neutral, the organic solution was dried and concentrated in vacuum to yield 2β,3β-diacetoxy-Δ$^{7,22}$-5β-ergostadien-6-one, melting point 148–150° C. (from acetone/hexane).

(C) Synthesis of 2β,3β-diacetoxy-14α-hydroxy-5β-Δ$^{7,22}$-ergostadien-6-one

A solution of 5.8 grams of 2β-acetoxy-3β-hydroxy-5α-Δ$^{7,22}$-ergostadien-6-one in 80 milliliters each of absolute pyridine and acetic anhydride was allowed to stand at room temperature overnight and then was decomposed with ice water, and extracted with chloroform. The extracts were washed until neutral and evaporated to yield 2β,3β-diacetoxy-5α-Δ$^{7,22}$-ergostadien-6-one, melting point 195–196° C. (from methanol).

A solution of 3 grams of 2β,3β-diacetoxy-5α-Δ$^{7,22}$-ergostadien-6-one in 120 milliliters of absolute dioxane was heated to 80° in an inert atmosphere. After the addition of 6.1 grams of selenium dioxide, the reaction mixture was stirred for 15 minutes, filtered, diluted with water and extracted with ether. The extract was washed with water and the solvent evaporated. The residue was chromatographed on 100 grams of alumina, using benzene containing 10 percent of ether as the eluting agent, to obtain 2β,3β - diacetoxy-14α-hydroxy-5α-Δ$^{7,22}$-ergostadien-6-one, melting point after recrystallization from isopropyl ether, 226–227° C.

A mixture of 1.3 grams of 2β,3β-diacetoxy-14α-hydroxy-5α-Δ$^{7,22}$-ergostadien-6-one, 60 milliliters of methanol, 5 milliliters of water and 0.5 gram of potassium carbonate was heated at boiling overnight in an inert atmosphere. The reaction mixture was then diluted with water and extracted with chloroform. The extract was washed until neutral, dried and evaporated. The crude reaction product was reacted with acetic anhydride in pyridine according to the procedure described in Example 1C(3). After workup, the crude product was chromatographed on 30 grams of alumina. Elution with benzene-ether (1:1) yielded 2β,3β-diacetoxy-14α-hydroxy-5β-Δ$^{7,22}$-ergostadien-6-one, melting point 202–203° C. (from methanol).

In an alternative procedure a mixture of 1 gram of 2β-acetoxy-3β-hydroxy-5α-Δ$^{7,22}$-ergostadien-6-one, 2 grams of selenium dioxide and 30 milliliters of absolute dioxane is stirred at room temperature for 24 hours. The reaction mixture was filtered and the filtrate was stirred with 0.5 gram of deactivated Raney nickel. After filtration and evaporation, there was obtained 2β-acetory-3β,14α-dihydroxy-5α-Δ$^{7,22}$-ergostadien-6-one, melting point 254–256° C. (decomp.) (from acetonitrile).

A solution of 600 milligrams of 2β-acetoxy-3β,14α-dihydroxy-5α-Δ$^{7,22}$-ergostadien-6-one in 40 milliliters of methanol and 5 milliliters of water was treated with 250 milligrams of potassium carbonate according to the procedure described above. After workup, there was obtained 2β,3β-diacetoxy-14β-hydroxy-5β-Δ$^{7,22}$-ergostadien-6 - one, which is identical wit hthe product produced as described above.

(D) Synthesis of (22R),2β,3β,14α,22,25-pentahydroxy-5β-Δ$^7$-cholesten-6-one (cedyson)

A solution of 4 grams of 2β,3β-diacetoxy-5α-Δ$^{7,22}$-ergostadien-6-one (produced as described in part C above) in 750 milliliters of methylene chloride and 500 milliliters of methanol was treated at −70° C. over a 75-minute period with 10 millimols of ozone which was supplied in an oxygen stream. After the addition of 15 milliliters of trimethoxyphosphine, the mixture was stirred for 30 minutes, then decomposed with water and extracted with ether. Processing of the other extract s afforded a crude product which was quickly chromatographed on alumina to obtain (20S),2β,3β-diacetoxy-20-formyl-5α-Δ$^7$-pregnen-6-one, melting point 211–212° C. (from methylene chloride-ether).

To a solution of ethyl magnesium bromide (prepared from 2 grams of magnesium and 6.4 milliliters of ethyl bromide in 100 milliliters of ether), there was added dropwise a solution of 16 milliliters of 2-methyl-2-tetrahydropyranyloxy-3-butyne in 100 milliliters of tetrahydrofuran. The reaction solution was stirred for 30 minutes at room temperature and then added dropwise with stirring to a solution of 4.7 grams of (20S),2β,3β-diacetoxy-20-formyl-5α-Δ$^7$-pregnen-6-one in 200 milliliters of tetrahydrofuran at −10° C. The temperature of the reaction mixture was allowed to rise to 0° C., whereupon the mixture was decomposed by the addition of ammonium chloride solution. Extraction with ether afforded a crude product which was chromatographed on 200 grams of alumina. The fractions obtained by elution with 2 liters of benzene-petroleum ether (1:1) were discarded. The product was then eluted with chloroform containing 10 percent of methanol and again chromatographed on 140 grams of alumina. After removal of undesired by-products, the (22R),2β,3β-diacetoxy-22-hydroxy - 25 - (tetrahydropyran-2-yloxy)-5α-Δ$^7$-cholesten-23-yn-6-one was eluted with benzene and benzene containing 1 percent of ether. Melting point 188° C. (from isopropyl ether).

A solution of 1 gram of (22R),2β,3β-diacetoxy-22-hydroxy-25-(tetrahydropyran - 2 - yloxy)-5α-Δ$^7$-cholesten-23-yn-6-one in 50 milliliters of methanol was hydrogenated in the presence of 200 milligrams of prehydrogenated platinum until the uptake of 75 milliliters of hydrogen. After workup there was obtained (22R),2β,3β-diacetoxy-22-hydroxy-25-(tetrahydropyran - 2 - yloxy)-5α-Δ$^7$-cholesten-6-one, melting point 155–156° C. (from isopropyl ether).

A solution of 3 grams of (22R),2β,3β-diacetoxy-22-hydroxy-25-(tetrahydropyran - 2 - yloxy)-5α-Δ$^7$-cholesten-6-one in 150 milliliters of absolute dioxane was stirred with 6 grams of selenium dioxide at 20° C. for 15 hours. The suspension was filtered, and 1 gram of deactivated Raney nickel was added to the filtrate. After stirring for 30 minutes and filtration, the solution was diluted with chloroform, washed with water and evaporated. Recrystallization of the residue from ether afforded (22R),2β,3β-diacetoxy - 14α,22 - dihydroxy-25-(tetrahydropyran-2-yloxy)-5α-Δ$^7$-cholesten-6-one, melting point 194–195° C.

A solution of 1 gram of (22R),2β,3β-diacetoxy-14α,22-dihydroxy-25-(tetrahydropyran - 2 - yloxy)-5α-Δ$^7$-cholesten-6-one and 200 milligrams of potassium carbonate in 20 milliliters of methanol was heated to reflux for 2 hours. The reaction mixture was diluted with 200 milliliters of ethyl acetate, washed with saturated brine, dried and evaporated. The residue was dissolved in 16 milliliters of methanol, and allowed to stand with 4 milliliters of 2 N hydrochloric acid for 15 minutes at room temperature. The mixture was then neutralized with 8 milliliters of 1 N sodium hydroxide and, after the addition of ethanol, evaporated to dryness. The residue was dissolved in tetrahydrofuran and the resulting solution was filtered and evaporated. Recrystallization from methyl ethyl ketone afforded (22R),2β,3β,14α22,25-pentahydroxy-5β-Δ$^7$-cholesten-6-one, melting point 233° C. (decomp.). Melting point after further recrystallization from methanol-acetone, 241° C. (decomp.).

(E) Synthesis of 3β-acetoxy-22-hydroxy-25-(tetrahydropyran-2-yloxy)-5α-Δ$^7$-cholesten-23-yn-6-one Employing procedures similar to those described above, 3β-acetoxy-Δ$^{7,22}$-5α-orgostadien-6-one was subjected to ozonolysis to produce 3β-acetoxy-20-formyl-5α-Δ$^7$-pregnen-6-one.

To an ethyl magnesium bromide solution [produced from 244 milligrams of magnesium and 0.84 milliliter of ethyl bromide in 15 milliliters of ether], there was added dropwise a solution of 1.93 milliliters of 2-methyl-2-tetra-hydropyranyloxy-3-butyne in 10 milliliters of tetrahydrofuran, and the resulting mixture was stirred for one hour at room temperature. The resulting solution was cooled to 0–5° C. and there was added a solution of 386.5 milligrams of 3β-acetoxy-20-formyl-5α-Δ$^7$-pregnen-6-one in 10 milliliters of tetrahydrofuran. The resulting mixture was stirred for 45 minutes and then mixed with saturated ammonium chloride solution. After taking the product up in ether, it was washed with saturated salt solution, dried and evaporated. After chromatographing on silica gel, there was obtained 3β-acetoxy-22-hydroxy-25-(tetrahydropyran-2-yloxy)-5α - Δ$^7$ - cholesten-23-yn-6-one, melting point 175–178° C. (from hexane/ether).

EXAMPLE IV.—FROM METHYL 3,3-ETHYLENE-DIOXY-Δ$^5$-PREGNENE-20-CARBOXYLATE (A) Synthesis of methyl 3,3-ethylenedioxy-5,6-oxidopregnene-20-carboxylate To a mixture of 331 grams of methyl 3,3-ethylenedioxy-Δ$^5$-pregnene-20-carboxylate [K. Morita, Chem. Abs., 54, 4679 (1960)], 80 grams of potassiumacetate, 166 grams of sodium sulfate, and 3300 milliliters of methylene chloride, there was added dropwise under ice cooling 275 milliliters of 40 percent peracetic acid. The resulting reaction mixture was stirred at 22° C. for 2 hours, treated with water and diluted with methylene chloride. The methylene chloride phase was separated, washed with sodium carbonate solution and water, dried over sodium sulfate and evaporated in vacuum to yield the desired 5,6-oxido-compound as an isomeric mixture.

(B) Synthesis of 5β-H-compounds via 5,6 - epoxides (1) SYNTHESIS OF METHYL 2β,3β-DIHYDROXY-5β,6β-OXIDOPREGNANE-20-CARBOXYLATE The epoxide mixture as described in A above was dissolved in 2500 milliliters of tetrahydrofuran, treated at 0–5° C. with 690 milliliters of 3 N perchloric acid and allowed to stand at 5° C. for 16 hours. The resulting solution was stirred into 30 liters of ice water, neutralized and the precipitated diol was filtered off by suction, washed and dried. After recrystallization from acetone, there was obtained methyl 5α,6β-dihydroxypregnan-3-one-20-carboxylate, melting point 233–235° C.

To a solution of 10 grams of the 5α6β-diol in 128 milliliters of tetrahydrofuran there was added dropwise over 8 minutes with ice cooling a solution of 1.365 milliliters of bromine in 15 milliliters of glacial acetic acid. After stirring for an additional 5 minutes the reaction solution was poured into ice water containing sodium acetate and then extracted with methylene chloride. The methylene chloride solution was washed until neutral, evaporated in vacuum at 30° C. and the residue was triturated with isopropyl ether to yield methyl 2α-bromo-5α,6β-dihydroxypregnan-3-one-20-carboxylate.

To a mixture of 8.9 grams of the thus-obtained 2α-bromo-compound in 80 milliliters of dry tetrahydrofuran, there was added at 0–5° C. a solution of 9.6 grams of lithium tri(tert.-butoxy)aluminum hydride in 50 milliliters of tetrahydrofuran. The resulting mixture was stirred into a sulfuric acid/ice water mixture, extracted with acetic ester, washed until neutral and evaporated in vacuum. Upon recrystallization from isopropyl ether and then from acetone there was obtained methyl 2α-bromo-3β,5α,6β-trihydroxypregnane-20-carboxylate, melting point 217–218° C. (dec.).

A solution of 8.5 grams of the thus-obtained triol in 85 milliliters of glacial acetic acid was treated with 17 milliliters of acetic anhydride and 850 milligrams of p-toluenesulfonic acid and then allowed to stand at room temperature for 48 hours. The resulting solution was stirred into ice water and the resulting precipitate was filtered off by suction, washed with water and dried. After recrystallization from isopropyl ether, there was obtained methyl 2α-bromo-3β,5α,6β-triacetoxypregnane-20-carboxylate, melting point 211–213° C. (dec.).

A solution of 7.1 grams of the triacetate in 145 milliliters of glacial acetic acid was heated under reflux for 22 hours with 5 grams of silver acetate and 3 milliliters of water. The precipitate was filtered off by suction, and the filtrate was poured into ice water. The reaction product which precipitated was filtered off by suction, washed until neutral and dried. After chromatographing on silica gel and recrystallization from acetone/hexane, there was obtained methyl 2β,3β,5α,6β-tetraacetoxypregnane-20-carboxylate, melting point 202–203° C.

A solution of 15.74 grams of tetraacetate in 315 milliliters of methanol and 79 milliliters of water was refluxed for 2 hours with 11.8 grams of potassium hydroxide and then neutralized with acetic acid. After vacuum distillation to remove the methanol, the residue was treated with 200 milliliters of water. The reaction product which precipitated was filtered off by suction, washed with water and dried. The crude carboxylic acid thus obtained was allowed to stand at room temperature for one hour in 200 milliliters of methylene chloride and 200 milliliters of etheric diazomethane solution (manufactured from 30 grams of nitrosomethylurea). After evaporation in vacuum, chromatography of the residue on silica gel and recrystallization from acetone/hexane, there was obtained methyl 2β,3β-dihydroxy-5,6β-oxidopregnane-20-carboxylate, melting point 185.5–186° C.

(2) SYNTHESIS OF METHYL 2β,3β-ISOPROPYLIDENE-DIOXY-5,6β-OXIDOPREGNANE-20-CARBOXYLATE

A mixture of 300 milligrams of the tetraacetate produced as described above in 6 milliliters of a 10 percent methanolic potassium hydroxide solution was allowed to stand at room temperature for 16 hours. After acidification with 1 N hydrochloric acid, the solution was diluted with ethyl acetate, washed until neutral and evaporated. The residue was admixed with 30 milliliters of etheric diazomethane solution (manufactured from 2 grams of nitrosomethylurea) and allowed to stand for 2 hours. The resulting solution was evaporated under vacuum and the residue was purified by preparative thin layer chromatography to obtain methyl 2β,3β,6β-trihydroxy-5α-acetoxypregnane-20-carboxylate, melting point 220–221.5° C.

A mixture of 2.55 grams of the trihydroxy-monoacetoxy compound, 0.4 milliliter of boron trifluoride etherate, and 100 milliliters of dry acetone was allowed to stand at room temperature for 30 minutes. After the addition of 2 milliliters of pyridine, the reaction mixture was evaporated under vacuum and the residue was precipitated with ice water. After filtering off the precipitate by suction, it was dried and then recrystallized from acetone/hexane to yield methyl 2β,3β-isopropylidenedioxy-5α-acetoxy-6β-hydroxypregnane-20-carboxylate, melting point 192.5–193° C.

A mixture of 600 milligrams of this product, 48 milliliters of methanol, 12 milliliters of water, and 1.8 grams of potassium hydroxide was heated under reflux for 3¼ hours. The mixture was then stirred into ice water, acidified with hydrochloric acid, and the resulting precipitate was filtered off by suction, washed until neutral and dried. The crude acid was dissolved in 5 milliliters and tetrahydrofuran and allowed to stand for 2 hours with 30 milliliters of etheric diazomethane solution. The resulting solution was evaporated under vacuum and the residue was fractionated by preparative thin layer chromatography to yield methyl 2β,3β-isoproplyidenedioxy-5,6β-oxidopregnane-20-carboxylate, melting point 149.5–150° C, and methyl 2β,3β-isopropylidenedioxy-5α,6β-dihydroxypregnane-20-carboxylate, melting point 266–267° C (3) SYNTHESIS OF METHYL 2β,3β-ISOPROPYLIDENE-DIOXY-5,6α-OXIDOPREGNANE-20-CARBOXYLATE A mixture of 200 milligrams of the 5α,6β-diol produced as described above, 5 milliliters of pyridine and 0.5 milliliter of methanesulfonic acid chloride was stirred at 5° C. for 16 hours. The resulting mixture was poured into ice water, filtered by suction and dried. The crude 6-mesylate in admixture with 10 milliliters of pyridine, 10 milliliters of water, and 3 grams of sodium bicarbonate was heated under reflux for 30 minutes. The resulting mixture was stirred into water and extracted with methylene chloride. The methylene chloride solution was washed with dilute hydrochloric acid and water and then evaporated. After recrystallization from acetone, there was otbained methyl 2β,3β-isopropylidenedioxy-5,6α-oxidoprognane-20-carboxylate, melting point 199–201° C.

(4) SYNTHESIS OF METHYL 2β,3β-DIHYDROXY- AND 2β,3β - DIACETOXY - 5β - PREGNAN-6-ONE-20-CARBOXYLATES (a) From methyl 2β,3β-dihydroxy-5,6β-oxido-pregnane-20-carboxylate.—A mixture of 100 milligrams of methyl 2β,3β - dihydroxy - 5,6β - oxidopregnane-20-carboxylate, 10 milliliters of benzene, and 0.1 milliliter of boron trifluoride etherate was stirred at room temperature for 20 hours. After the addition of 0.5 milliliter of pyridine, the mixture was diluted with ethyl acetate, washed in sequence with water, 1 N hydrochloric acid, and again with water, dried and evapoarted. From the residue there was isolated by preparative thin layer chromatography methyl 2β,3β-dihydroxy-5β-pregnan-6-one-20-carboxylate, which after recrystallization from isopropyl ether/methylene chloride, melted at 181.5–183° C.

(b) From methyl 2β,3β-isopropylidenedioxy-5,6β-oxido-pregnane-20-carboxylate.—A mixture of 100 milligrams of methyl 2β,3β - isopropylidenedioxy - 5,6β-oxidopregnane-0-carboxylate, 5 milliliters of acetone and 0.2 milliliter of boron trifluoride etherate was stirred at room temperature for 1 hour and then treated with 0.5 milliliter of pyridine and evaporated under vacuum. The residue was heated on a steam bath for 2 hours in admixture with 10 milliliters of 61 percent acetic acid and 1 drop of 2 N sulfuric acid. The resulting mixture was stirred into water and extracted with chloroform. The extract was washed with water, evaporated and the residue was recrystallized from isopropyl ether to yield methyl 2β,3β- dihydroxy - 5β-pregnan-6-one - 20 - carboxylate identical with the compound produced in part (a) above.

(c) Synthesis of methyl 2β,3β-diacetoxy-5β-pregnan-6-one-20-carboxylate.—A mixture of 200 milligrams of methyl 2β,3β-dihydroxy-5β-pregnan-6-one-20-carboxylate, 2 milliliters of glacial acetic acid, 0.4 milliliter of acetic anhydride, and 20 milligrams of p-toluenesulfonic acid was allowed to stand at 20° C. for 24 hours. The resulting mixture was stirred into ice water and extracted with methylene chloride. The methylene chloride solution was washed until neutral, concentrated and recrystallized from isopropyl ether to yield methyl 2β,3β-diacetoxy-5β-pregnan-6-one-20-carboxylate, melting point 176.5–177.5° C.

(5) SYNTHESIS OF METHYL 2β,3β-ISOPROPLIDENE-DIOXY-5β-PREGNAN-6-ONE-20-CARBOXYLATE (a) From methyl 2β,3β - isopropylidenedioxy - 5,6α-oxidopregnane-20-carboxylate.—A mixture of 200 milligrams of methyl 2β,3β-isopropylidenedioxy-5,6α-oxidopregnane-20-carboxylate, 10 milliliters of benzene, and 0.2 milliliter of boron trifluoride etherate was stirred for 5 hours at room temperature. After workup as described in part (4)(a) above, there was recovered methyl 2β,3β-isopropylidenedioxy - 5β - pregnan - 6 - one-20-carboxylate, melting point 196.5–198° C. (from isopropyl ether).

(b) From methyl 2β,3β-dihydroxy-5β-pregnan-6-one-20-carboxylate.—A mixture of 150 milligrams of methyl 2β,3β - dihydroxy - 5β - pregnan - 6 - one-20-carboxylate, 10 milliliters of acetone, and 0.03 milliliter of boron trifluoride ethereate was allowed to stand at room temperature for 30 minutes. After workup as described above, there was obtained methyl 2β,3β-isopropylidenedioxy-5β-pregnan-6-one-20-carboxylate identical to that produced in part (a) above.

(C) Synthesis of 5β-H-compounds via isomerization of 5α-H-compounds (1) SYNTHESIS OF METHYL (20S),2β,3β-DIACETOXY-5α-PREGNAN-6-ONE-20-CARBOXYLATE An epoxide mixture produced in the manner described in A above was dissolved in 2500 milliliters of tetrahydrofuran, treated with 690 milliliters of 3 N perchloric acid and heated under reflux for 3.5 hours. The resulting solution was stirred into 30 liters of ice water, neutralized and the precipitated dione filtered off by suction. After washing, drying, and recrystallization from ethyl acetate, there was obtained methyl (20S),5α-pregnane-3,6-dione-20-carboxylate, melting point 212–214° C.

To a mixture of 37.45 grams of the 3,6-dione in 800 milliliters of tetrahydrofuran, there was added dropwise with ice cooling a solution of 5.33 milliliters of bromine and 4.9 grams of potassium acetate in 50 milliliters of glacial acetic acid. The resulting reaction solution was poured into ice water containing sodium acetate. The precipitate which formed was filtered off by suction and recrystallized from methanol to yield methyl (20S),2α-bromo - 5α - pregnane-3,6-dione-20-carboxylate, melting point 161–162° C. (dec.).

A solution of 28 grams of the 2α-bromo-3,6-dione in 240 milliliters of tetrahydrofuran was diluted at 0–5° C. with a solution of 33.8 grams of lithium tri(tert.-butoxy) aluminum hydride in 160 milliliters of tetrahydrofuran. The resulting mixture was stirred into a sulfuric acid-ice water mixture and the precipitate which formed was filtered off by suction and recrystallized from ethyl acetate to yield methyl (20S),2α-bromo-3β-hydroxy-5α-pregnan-6-one-20-carboxylate, melting point 211–212° C.

A mixture of 19.4 grams of the resulting alcohol in 80 milliliters of pyridine and 40 milliliters of acetic anhydride was allowed to stand at room temperature for 20 hours. The resulting mixture was stirred into ice water and the precipitate which formed was filtered off by suction and recrystallized from acetone/hexane to yield methyl (20S),2α - bromo - 5α-pregnan-6-one-20-carboxylate, melting point 196–197° C.

A mixture of 81.2 grams of the product acetate, 800 milliliters of glacial acetic acid, 16.2 milliliters of water and 50 grams of silver acetate was heated under reflux for 20 hours. The precipitate which formed was filtered off by suction and the filtrate was stirred into ice water. The resulting precipitate was filtered off by suction, washed until neutral, and dried. After recrystallization from methanol, there was obtained 58.6 grams of methyl (20S),2β,3β-diacetoxy-pregnan-6-one-20-carboxylate as a mixture of 5α- and 5β-isomers. After fractional crystallization from methylene chloride-isopropyl ether and methylene chloride-methanol, there was recovered the 5α-isomer, melting point 222.5–224° C., and the 5β-isomer, melting point 176.5–177.5° C·

(2) SYNTHESIS OF METHYL 2β,3β-DIACETOXY-5α-Δ⁷-PREGNAN-6-ONE-20-CARBOXYLATE

A mixture of 29.3 grams of the mixture of 5α-H- and 5β-H-isomers produced as described above in 500 milliliters of glacial acetic acid was treated dropwise with 3.3 grams of bromine in glacial acetic acid and the resulting mixture was stirred at 50° C. for 2 hours. The reaction mixture was then stirred into an ice/potassium acetate solution and the precipitate which formed was filtered off by suction, washed until neutral, and dried. After recrystallization from acetone/hexane, there was otbained methyl (20S),2β-3β-diacetoxy-7α-bromo-5α-pregnan - 6 - one-20-carboxylate, metling point 152–153° C.

A mixture of 38 grams of the 7α-bromo compound, 10.3 grams of lithium carbonate, 6.2 grams of lithium bromide, and 380 milliliters of dimethylformamide was heated at 120–125° C. for 4.5 hours under a nitrogen atmosphere. After filtration to remove undissolved lithium salts, the filtrate was stirred into ice water. The precipitate which formed was filtered off by suction, dried and chromatographed on silica gel. After recrystallization from isopropyl ether/methylene chloride, there was obtained methyl (20S),2β,3β-diacetoxy-5α-Δ⁷-pregnen-6-one-20-carboxylate, melting point 195–196° C.

(3) SYNTHESIS OF METHYL 2β,3β-DIHYDROXY- and 2β,3β-DIACETOXY-5β-Δ⁷-PREGNEN-6-ONE-20-CARBOXYLATE A solution of 500 milligrams of methyl 2β,3β-diacetoxy-5α-Δ⁷-pregnen-6-one-20-carboxylate, 20 milliliters of ethanol and 1.5 milliliters of 3 N hydrochloric acid was heated under reflux for 20 hours and worked up as described above. The resulting mixture of 5α- and 5β-H-isomers was then acetylated as described above to yield methyl (20S),2β,3β - diacetoxy-5β-Δ⁷-pregnen-6-one-20-carboxylate, melting point 194.5–195.5° C. Hydrolysis of this product as previously described yields the corresponding methyl 2β,3β-dihydroxy-5β-H-isomer, melting point 224–226° C. (from acetone/hexane).

(4) SYNTHESIS OF METHYL 2β,3β,14α-TRIHYDROXY- AND 2β,3β-DIACETOXY-14α-HYDROXY-5β-Δ⁷-PREGNEN-6-one-20-CARBOXYLATE A mixture of 1.5 grams of methyl (20S),2β,-3β-diacetoxy-5α-Δ⁷-pregnen-6-one-20-carboxylate, 1.5 grams of selonium dioxide and 107 milliliters of dioxane was stirred at 90° C. for 30 minutes. After filtering off the insoluble selenium, the filtrate was stirred into ice water. The precipitate which formed was filtered off by suction, washed until neutral and dried. After recrystallization from methanol, there was obtained methyl (20S),2β,3β-diacetoxy-14α-hydroxy-5α-Δ⁷-pregnen-6-one - 20 - carboxylate, melting point 248–249.5° C.

A 300-milligram portion of the resulting product was heated under reflux in 10 milliliters of methanol and 0.5 gram of potassium hydroxide for 1 hour and then worked up as described above. After recrystallization from acetone, there was obtained methyl (20S),2β,3β,14α-trihydroxy-5β-Δ⁷-pregnen-6-one-20-carboxylate, melting point 238–240° C.

Employing procedures similar to those described above, 30 milligrams of the 2β,3β,14α-trihydroxy compound were acetylated with 1 milliliter of pyridine in 0.5 milliliter of acetic anhydride. After recrystallization from acetone/hexane, there was obtained methyl (20S),2β,3β-diacetoxy-14α-hydroxy-5β-Δ⁷-pregnen-6-one - 20 - carboxylate, melting point 241–242° C.

(5) SYNTHESIS OF (22R),2β,3β,14α,22,25 - PENTAHYDROXY-5β-Δ⁷-CHOLESTEN-6-ONE (ECDYSON)

A mixture of 10 grams of methyl (20S),2β,3β-diacetoxy-5α-Δ⁷-pregnen-6-one-20-carboxylate, 12 grams of anhydrous lithium iodide, and 100 milliliters of lutidine was heated under reflux for 2 hours. The resulting reaction mixture was poured into ice water, acidified with hydrochloric acid and saturated with sodium chloride. The insoluble reaction product was filtered off by suction, dissolved in methylene chloride and chromatographed twice on silica gel. On recrystallization from acetone/hexane, there was obtained (20S),2β,3β-diacetoxy-5β-Δ⁷-pregnen-6-one-20-carboxylic acid, melting point 245–247° C. There was also recovered methyl (20R),2β-3β-diacetoxy-5β-Δ⁷-pregnen-6-one-20-carboxylic acid, melting point 205.5–208° C. (from acetone/hexane).

A mixture of 1.9 grams of the (20S),20-carboxylic acid, 38 milliliters of absolute tetrahydrofuran, and 10 grams of carbonylidimidazole was heated for 20 minutes under reflux. The resulting reaction solution was poured into ice water, acidified with hydrochloric acid, and saturated with sodium chloride. The insoluble imidazolide was separated and dried. A solution of a 2-gram portion of the imidazolide in 40 milliliters of tetrahydrofuran was treated with 2 grams of lithium trl-(tert.-butoxy)aluminum hydride and then stirred at room temperature for 1 hour. The resulting mixture was then stirred into ice water, acidified with hydrochloric acid and, after buffering with sodium ethylate, extracted with methylene chloride. After distillation of the solevnt, chromatographing on silica gel, and crystallization from acetone/hexane, there was obtained (20S),2β,3β - diacetoxy-20-formyl-5β-Δ⁷-pregnen-6-one, melting point 200–202° C.

To an ethyl magnesium bromide solution (produced from 488 milligrams of magnesium and 1.68 milliliters of ethyl bromide in 25 milliliters of ether), there was added 3.86 milliliters of 2-methyl-2-tetrahydropyranyloxy-3-butyne in 20 milliliters of tetrahydrofuran dropwise. After stirring for 30 minutes, the Grignard solution was added to an ice-cooled solution of 820 milligrams of the 20-formyl compound produced as described above in 20 milliliters of tetrahydrofuran and then stirred for 5 minutes. The reaction mixture was treated with saturated ammonium chloride solution and the reaction product was taken up in ether, washed with saturated salt solution, dried and evaporated. After chromatographing on silica gel, there was obtained (22R),2β,3β-diacetoxy-22-hydroxy - 25 - tetrahydropyranyloxy-5β-Δ⁷-cholesten-23-yn-6-one, melting point 175–178° C. (from hexane/ether). The (22S)-isomer (melting point 172–173° C.) was also obtained.

To a solution of 227 milligrams of this product in 10 milliliters of methanol, there was added 60 milliliters of platinum dioxide and the resulting mixture was hydrogenated until hydrogen uptake ceased. After filtration of the catalyst and evaporation of the solvent under vacuum, the residue was crystallized from acetone/hexane to yield (22R),2β,3β,22 - trihydroxy - 25 - tetrahydropyranyloxy-5β-Δ⁷-cholesten-23-yn-6-one, melting point 147–150° C.

A solution of 100 milligrams of the thus-produced triol in 2 milliliters of dioxane was treated with 100 milligrams of selenium dioxide and heated for 1 hour at 90° C. The resulting reaction mixture was subjected to preparative thin layer chromatography and after crystallization from tetrahydrofuran/pentane, there was obtained (22R),2β,3β,14α,22,25 - pentahydroxy - 5β - Δ⁷ - cholesten-6-one (ecdyson), melting point 232–233° C.

Employing the (22S)-isomer isolated after the Grignard reaction, there was produced in a similar manner (22S),2β,3β,14α,22,25-pentahydroxy-5β-Δ⁷-cholesten-6-one (isoecdyson), melting point 227–230° C. (from acetone).

EXAMPLE V.—FROM 3,3-ETHYLENEDIOXY-20-HYDROXYMETHYL-Δ⁵-PREGNEN

Employing procedures similar to those described in Example IVA, 3,3-ethylenedioxy-20-hydroxymethyl-Δ⁵-pregnen was reacted with peracetic acid to produce the corresponding 5,6-epoxide, which was converted to 20-hydroxymethyl-5α-pregnane-3,6-dione (melting point 180–181° C.) by treatment with perchloric acid in the manner described in Example IVC(1).

Employing the techniques described in Example IVC(1), the dione was reacted with bromine to produce 2α - bromo - 20 - hydroxymethyl-5α-pregnane-3,6-dione, the 2α-bromo compound was reduced with lithium tri (tert.-butoxy)aluminum hydride to produce 2α-bromo-3β - hydroxy - 20-hydroxymethyl-5α-pregnan-6-one, followed by acetylation to 3β-acetoxy-20-acetoxymethyl-2α-bromo-5α-pregnan-6-one (melting point 208–209° C.), and then reacted with silver acetate to produce 2β,3β-diacetoxy-20-acetoxymethylpregnan-6-one as a mixture of the 5α-H- and 5β-H-isomers.

Employing procedures similar to those described in Example IVC(2), the isomeric mixture was brominated to form 2β,3β-diacetoxy-20-acetoxymethyl-7α-bromo-5α-pregnan-6-one (melting point 147–148° C.) which was dehydrobrominated to form 2β,3β-diacetoxy-20-acetoxymethyl - 5α - Δ⁷ - pregnen - 6-one (melting point 208.5–209° C.).

The triacetate was reacted with selenium dioxide in the manner similar to that described in Example IVC(4) to produce 2β,3β - diacetoxy - 20 - acetoxymethyl-14α-hydroxy-5α-Δ⁷-pregnen-6-one, melting point 253–254° C.

A solution of 550 milligrams of 2β,3β-diacetoxy-20-acetoxymethyl-14α-hydroxy-5α-Δ⁷-pregnen-6-one in 27.5 milliliters of 1 percent potassium hydroxide in methanol was heated at boiling for 30 minutes. The reaction mixture was then processed in a manner similar to the procedure described in Example 1C to obtain 2β,3β,14α-trihydroxy-20-hydroxymethyl-5β-Δ⁷-pregnen-6-one, melting point 255–257° C. (from tetrahydrofuran-ethyl acetate).

A solution of 200 milligrams of 2β,3β,14α-trihydroxy-20-hydroxymethyl-5β-Δ⁷-pregnen-6-one in 50 milliliters of acetone was treated with 0.2 milliliter of boron trifluoride etherate and processed as described in Example IID. There was obtained 2β,3β-isopropylidenedioxy-14α-hydroxy - 20-hydroxymethyl-5β-Δ⁷-pregnen-6-one, melting point 240–241° C. (from acetone/hexane).

EXAMPLE VI.—FROM 3α-HYDROXY-20,20-ETHYLENEDIOXYPREGNAN-6-ONE

3α-hydroxy-20,20-ethylenedioxypregnan-6-one was oxidized in known manner to 20,20-ethylenedioxypregnane-3,6-dione. Employing techniques described in Example IVC, the 3,6-dione was brominated to form 2α-bromo-20,20-ethylenedioxypregnane-3,6-dione, the 2α-bromo-compound was reduced with lithium tri(tert.-butoxy) aluminum hydride to form 2α-bromo-3β-hydroxy-20,20-ethylenedioxypregnan-6-one, the alcohol was converted to the corresponding 3β-acetate, and the 2α-bromo-3β-acetoxy - 20,20 - ethylenedioxy - 5α-pregnan-6-one was reacted with silver acetate to produce 2β,3β-diacetoxy-20,20-ethylenedioxypregnan-6-one as a mixture of the 5α-H- and 5β-H-isomers.

Employing procedures similar to those described in Example IVC, the isomeric mixture was brominated to form 2β,3β - diacetoxy - 7α-bromo-20,20-ethylenedioxy-5α-pregnan-6-one, followed by dehydrobromination to 2β,3β - diacetoxy - 20,20 - ethylenedioxy-5α-Δ⁷-pregnen-6-one.

Acidic ketal cleavage in known manner lead to 2β,3β-diacetoxy-5α-Δ⁷-pregnene-6,20-dione. This dione was then reacted with 2-methyl-2-tetrahydropyranyloxy-5-bromopentane, employing the known Wittig-reaction techniques, to produce 2β,3β-diacetoxy-25-tetrahydropyranyloxy-5α-Δ⁷,²⁰⁽²²⁾-cholestadien-6-one. After selective epoxidation of the Δ²⁰⁽²²⁾-double bond, hydrolysis of the epoxide to the 20,22-diol and 14α-hydroxylation with selenium dioxide, there was obtained 2β,3β-diacetoxy-14α,20,22,25-tetrahydroxy-5α-Δ⁷-chloesten-6-one.

A solution of 500 milligrams of 2β,3β-diacetoxy-14α,-20,22,25-tetrahydroxy-Δ⁷-cholesten-6-one and 250 milligrams of potassium carbonate in 100 milliliters of methanol was heated at boiling for 50 minutes. The reaction mixture was then neutralized with acetic acid and evaporated to dryness in vacuo. Isolation and purification of the reaction product was accomplished by preparative layer chromatography on silica gel using chloroform-methanol. There was obtained 2β,3β,14α,20,22,25-hexahydroxy-5β-Δ⁷-cholesten-6-one, melting point 237.5–239.5° C.

We claim:
1. A compound of the formula:

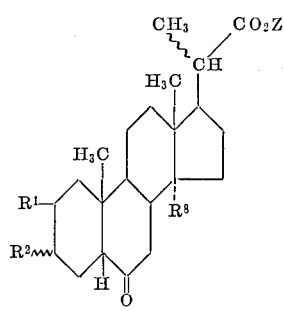

wherein $R^1$ and $R^2$, independently, are members selected from the group consisting of hydroxy and a radical derived from an aliphatic carboxylic acid of up to 11 carbons by removal of the hydroxygen of a carboxyl group and $R^1$ and $R^2$ when taken together and $R^2$ is in the β-configuration are lower alkylenedioxy; Z is a member selected from the group consisting of hydrogen and lower alkyl; and $R^8$ is hydrogen or hydroxy.

2. A compound as in claim 1 wherein Z is methyl.
3. A compound as in claim 2 wherein $R^1$ and $R^2$ are both β-hydroxy.
4. A compound as in claim 2 wherein $R^1$ and $R^2$ are both β-acetoxy.
5. A compound as in claim 4 wherein $R^1$ and $R^2$ when taken together are isopropylenedioxy.
6. A compound as in claim 1 wherein $R_8$ is hydrogen.
7. A process for producing a compound of the formula:

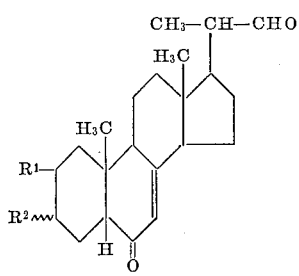

wherein $R^1$ and $R^2$, independently, are members selected from the group consisting of hydroxy and, a radical derived from an aliphatic carboxylic acid of up to 11 carbons by removal of the hydrogen of a carboxyl group and $R^1$ and $R^2$, when taken together and $R^2$ is in the β-configuration are lower alkylenedioxy; comprising reacting a compound of the formula:

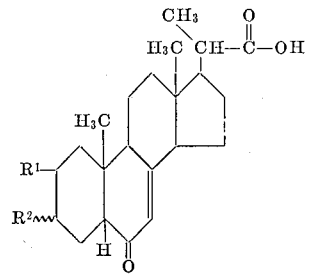

wherein $R^1$ and $R^2$ are as above, with a carbonyl diimidazole and thereafter reacting the thus produced imidazolide with a lithium tri-(lower alkoxy)-aluminum hydride.

8. The process for producing a compound of the formula:

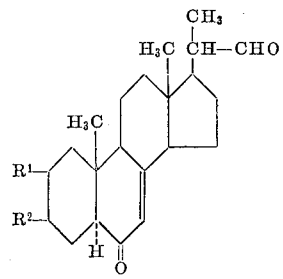

wherein $R^1$ and $R^2$, independently, are members selected from the group consisting of hydroxy and, a radical derived from an aliphatic carboxylic acid of up to 11 carbons by removal of the hydrogen of a carboxyl group and; $R^1$ and $R^2$, when taken together and $R^2$ is in the β-configuration are lower alkylenedioxy; comprising reacting a compound of the formula:

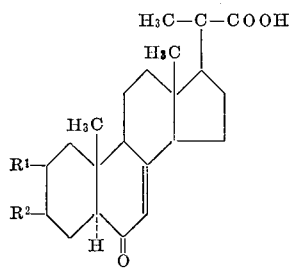

wherein $R^1$ and $R^2$ are as above, with a carbonyl diimidazole and thereafter reacting the thus produced imidazole with a lithium tri-(lower alkoxy)-aluminum hydride.

9. The process of claim 8 wherein the tri-(lower alkoxy)-aluminum hydride is lithium tri(t-butoxy) aluminum hydride.

10. The process for producing a compound of the formula:

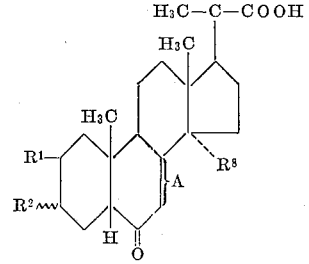

wherein $R^1$ and $R^2$ independently, are members selected from the group consisting of hydroxy and a radical derived from an aliphatic carboxylic acid of up to 11 carbons by removal of the hydrogen of a carboxyl group;

$R^1$ and $R^2$ when taken together and $R^2$ is in the β-configuration are lower alkylenedioxy; A is a single or double bond; $R^8$ is hydrogen or hydroxy; comprising contacting a compound of the formula:

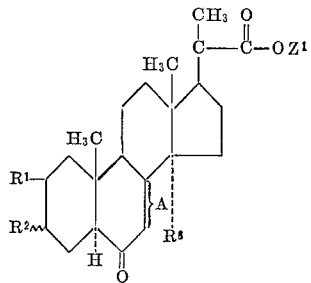

wherein $R^1$, $R^2$, $R^8$ and A are as above, and $Z^1$ is lower alkyl; with a mixture of lithium iodide and lutidine.

References Cited

UNITED STATES PATENTS 3,354,152  11/1967  Edwards et al. ---- 260—239.55
3,378,549  4/1968   Edwards et al. ---- 260—239.55

ELBERT L. ROBERTS, Primary Examiner

U.S. Cl. X.R.

260—397.1, 397.4, 397.45